United States Patent [19]

Tkatchenko

[11] 4,027,084
[45] May 31, 1977

[54] POLYMERIC DIPHOSPHOROUS COORDINATES AND THEIR METAL DERIVATIVES

[75] Inventor: Igor Tkatchenko, Caluire, France

[73] Assignee: Societe Nationale des Petroles d'Aquitaine, Paris, France

[22] Filed: July 7, 1975

[21] Appl. No.: 593,184

[30] Foreign Application Priority Data

July 5, 1974 France .................... 74.23445

[52] U.S. Cl. .................... 526/27; 526/17; 526/18; 526/21; 526/47; 526/240
[51] Int. Cl.$^2$ .................... C08F 8/40; C08F 8/42
[58] Field of Search .................... 526/27

[56] References Cited

UNITED STATES PATENTS 3,876,654  4/1975  Pattison .................... 526/27

FOREIGN PATENTS OR APPLICATIONS 960,473  6/1964  United Kingdom .................... 526/27

*Primary Examiner*—William F. Hamrock
*Attorney, Agent, or Firm*—Ostrolenk, Faber, Gerb & Soffen

[57] ABSTRACT

Novel polymeric diphosphine coordinates are obtained by reacting a diphosphine alkali alcoholate with an halogenated polymer, and their metal derivatives are obtained by reacting the coordinate with salts or transition metal complexes.

These metal polymers can be used as catalysts in catalysis reactions by means of coordination complexes.

12 Claims, No Drawings

POLYMERIC DIPHOSPHOROUS COORDINATES AND THEIR METAL DERIVATIVES

The invention relates to new polymeric coordinates containing a diphosphine. The invention also relates to a method preparing such coordinates as well as to their use to obtain various transition metal complexes. It relates also to the novel complexes obtained.

The increasing importance of catalysts constituted by transition metal complexes wherein the coordinates which are donors of 2 electrons and surrounding the metal are similar groups but grafted onto a polymeric chain, is now well recognized.

The catalysts of this type present a number of advantages over the conventional homogeneous systems constituted by a metallic ion generally surrounded by several coordinates L which donors of two electrons and represented by the general formula:

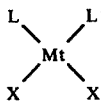

The following advantages can be particularly cited: insolubility in the reaction medium, which facilitates the separation from the reaction mixture; longer lifetime of the catalytic action, as the secondary reactions are blocked; and possibility of modifying the reaction selectivity due to the presence of certain privileged conformations of the polymer carrier. Among these catalytic systems, are known those wherein the coordinate is a phosphine which has been grafted onto a polymer leading to a complex containing only a monophosphine.

Some homogeneous catalytic reactions take place sometimes only if a diphosphine is coordinated to the metallic ion, which is the seat of the catalytic reaction. This is the case e.g. of the butadiene dimerization -functionalization reation, the butadiene-ethylene codimerization reaction, and the α-olefines hydrogenation.

It was therefor important to find catalytic complexes having the advantages of both types of catalysts, i.e. catalysts in which a diphosphine coordinated to the metallic ion would also be grafted onto a polymeric chain.

The present invention allows such novel complexes to be obtained by simple methods, using easily available products, carrying out first the synthesis of polymeric diphosphine coordinates, and then the metallation of these polymers.

The novel polymeric diphosphine coordinates and their metal derivatives obtained by conventional reactions between the polymeric diphosphine coordinate and a transition metallic compound, and have the distinctive feature of being obtained by reaction of a diphosphine alkali alcoholate, dissolved in a suitable solvent, with a halogenated polymer suspended in a suitable liquid.

This reaction may be schematically represented as follows:

$$M_aO(P_2) + Pol(hal) \rightarrow Pol\,O(P_2) + M_ahal \qquad (1)$$

The diphosphine alkali alcoholate represented by $M_aO(P_2)$ may also be represented by the following developed formula:

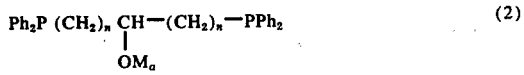

$$\text{(2)}$$

wherein $M_a$ is an alkali metal such as lithium, sodium, potassium, and wherein $n$ has a value of 1 and 4. When $n = 1$, the alcoholate can be obtained by the action of an alkali metal diphenyl phosphine $Ph_2PM_a$ on epichlorhydrin. This reaction, which is described (Chem. Ber. 1963 96.407) as leading, after treatment, to hydroxybis(diphenyl-phosphine) includes the intermediary stage of formation of alcoholates which can be isolated.

The halogenated polymer or resin (Hal Pol) which can be used in carrying out the invention includes a carbonaceous skeleton of widely variable origin(-polyvinylic, polybutadiene, polystyrenic skeleton). The halogen fixed on the polymer can be chlorine, bromine or iodine. For economical reasons, chlorinated polymers are preferably used. A more particularly preferred resin category is that of the chloromethylated polystyrenes, represented hereinafter by $(PS)CH_2Cl$. They may be initially cross-linked or not; cross-linking is carried out by copolymerization of styrene with various amounts of divinylbenzene. The products obtained are commerically available under various trademarks.

The incorporation rate of divinylbenzene if 0.25 to 10%, but preferably between 0.5 and 4% in order to have in the chloromethylated product a relatively easy access to the halogen sites to enable their reaction with the relatively voluminous reagent $MO(P_2)$. The chloromethylation rate ranges from 1 to 25%, but preferably from 5 to 20%; high chloromethylation rates involve necessarily a cross-linking. In the reaction under consideration, the cross-linking and chloromethylation rates will finally affect the activity of the catalyst containing this polymeric coordinate.

The reaction of the halogenated resin with the $M_aO(P_2)$ alcoholate is carried out in a solvent which does not react with said alcoholate: this solvent can be the same as that in which said alcoholate is obtained or may be any other non protic and non halogenated medium, such as aromatic hydrocarbons (benzene, toluene), cyclic hydrocarbons (cyclohexane), aliphatic hydrocarbons (hexane), ethers (tetrahydrofurane, dioxane, dimethoxyethane, diglyme). The reaction is preferably carried out first at normal temperature with a contact time varying from 2 to 24 hours and preferably from 4 to 8 hours, more preferably 6 hours, then at a higher temperature, which may reach the reflux temperature of the reaction medium, during 0.5 to 6 hours, preferably 1 to 3 hours.

It has been observed that the Pol $O(P_2)$ ether formation according to reaction (1) is more rapid when the Pol (hal) halogen is a iodide. Therefore, in order to increase the rate of the $(Pol)O(P_2)$ ether formation, it is an object of the invention to use the $M_aO(P_2)$ alcoholate in a suitable solvent with the product of the metathetic exchange reaction between the halogenated resin and an alkali metal iodide, if said resin is chlorinated or brominated. An halogen-iodine exchange takes place during this reaction.

When this exchange of the chloro or bromo radical with the iodo radical is previously performed, the halogenated resin is contacted in the suitable solvent with an excess amount of 10 to 100% of alkali iodide (LiI, NaI, KI, RbI, CsI) with respect to the stoichiometric quantity, during 2 to 24 hours, preferably 2 to 6 hours, at a temperature between 20° and 100° C, preferably between 20° and 50° C.

According to reaction (1) it can be noted that the amount of $M_aO(P_2)$ alcoholate to be involved depends on the halogen content of the halogenated polymer, and it has been shown that using an excess amount of alcoholate does not result in an appreciable improvement.

Another preferable embodiment of the invention permits preparation of the polymeric diphosphine coordinate in a single operation without isolating the intermediary products, by carrying out all the reactions in the same reactor, which is particularly advantageous when the alcoholate is obtained from epichlorhydrin.

According to that embodiment, the alkali-metal diphenyl phosphide itself is first prepared in the reactor, by conventional methods, e.g. by action of chlorodiphenylphosphine on an alkali metal in a suitable solvent according to the reaction schematically represented as follows:

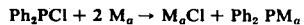

$$Ph_2PCl + 2 M_a \rightarrow M_aCl + Ph_2 PM_a$$

Suitable solvents may be those described hereinabove. Preferred solvents are ethers (particularly dioxane). When this first reaction is completed, the stoichiometric quantity of epichlorhydrin dissolved in the same solvent is added to the reaction medium. When the diphosphine alkali alcoholate is formed, the halogenated resin or the product of its reaction with an alkali metal iodide suspended in a suitable solvent is introduced into the reaction mixture. The solvent is generally the same as that used in the first two steps of the reaction.

The reaction is performed as described hereinabove; then the reaction mixture is concentrated and the polymeric diphosphine is isolated by precipitation in solvents, preferably methanol.

The polymeric diphosphine $(Pol)O(P_2)$ thus obtained is in powder form; it can coordinate the metals capable of forming coordination complexes with compounds of trivalent phosphorus. These metals are mainly those of groups III to VIII and of group Ib of the Periodic Table and particularly of group VIII. Titanium, vanadium, chromium, manganese, iron, cobalt, nickel, ruthenium, rhodium, palladium, iridium and platinium can be cited.

These complexes are formed by contacting, in a suitable solvent, at a selected temperature, generally near 50° C, the already obtained polymeric diphosphines, either with the transition salts $M_tX_n$ of the metals hereinabove mentioned, or with complexes of these transition metal salts, $L_mM_tX_n$, or with transition complexes of the same metals at a low degree of oxidation, $L_pM_tW_q$.

The coordinates L are donors of two electrons likely to be easily displaced, such as carbon monoxide, or donor solvents (aliphatic or aromatic nitriles, sulphoxides), or olefins, diolefins, amines, phosphines. The coordinates X are donors of one electron, such as halides, pseudo-halides, carboxylates, alcoholates. Some coordinates can also be of the LX type, such as the allylic coordinates, nitrosyl, acetylacetonate m,n,p, q represent integers between 0 and 6 and their sums m + n, p + q are not higher than 6. These transition metal compounds may include, in a not restrictive way: $TiCl_4$, $FeCl_2$, $CoCl_2$, $NiCl_2$, $Zr(OBu)_4$, $Pd(OAc)_2$, $(PhCN)_2PdCl_2$, $(Me_2SO)_4 NiCl_2$, $(PhCH)_2 PtCl_2$ $V(CO)_6$, $Cr(CO)_6$, $Mn_2(CO)_{10}$, $Fe(CO)_5$, $Fe_x(CO)_q$, $CO_2(CO)_8$, $Ni(CO)_4$, $Ni(COD)_2$, $Ni(acrylonitrile)_2$, $(C_3H_5NiBr)_2$, $Mo(CO)_6$, $(Ru(CO)_2Cl_2)_2$, $(Ph_3P)_4Pd$ $(Ph_3P)_2$ Pd (maleic anhydride), $RhCl (PPh_3)_3$, $(Rh (CO)_2 Cl)_2$, $W(CO)_6$, $Re(CO)_{10}$, Ir Cl (CO) $(PPh_3)_2$, $Pt(PPh_3)_3$.

Suitable solvents include any solvent which does not react with any one of the reacting substances, but dissolves at least partially one of them. Generally the polymeric diphosphine is suspended in a finely divided form, in a solvent of the metallic compound described above, but which is not a solvent of the polymer. These solvents may be aliphatic or aromatic hydrocarbons, ethers or alcohols. The metallic compound is added to the suspension and this reaction mixture is stirred until the metallic compound has reacted with the polymeric diphosphine. The reaction time and temperature are two factors which affect the incorporation rate of the metallic ion in the polymer. The presence of an excess amount of the metal derivative has only a secondary influence.

In some cases, it is preferable to carry out the reaction at two successive temperatures, particularly when the metal derivative undergoes two distinct transformations. Thus, in the case of $CO_2(CO)_8$, it is known that in a first step the action of a phosphorated coordinate L leads to $|CO(CO)_4L|^+|CO(CO)_4|^-$ which is then transformed, by less of carbon monoxide, into $CO_2(CO)_7L$, etc.

Temperatures between 0 and 100° C are generally suitable, but a reaction temperature between 20° C and 60° C is preferred.

The contact time may vary between 0.5 to 72 hours and depends generally on the temperature at which the contact is made. When operating at normal temperature, a contact time of 2 to 24 hours is generally preferred.

An increase of temperature reduces generally the contact time by facilitating the removal of some labile coordinates of the metallic compound.

As some metallic compounds are sensitive to oxygen and atmospheric mixture, the reactions are generally carried out in an inert atmosphere such as argon or nitrogen.

The metal-polymer complexes thus obtained can be used as catalysts in various reactions already described for homogeneous catalysts. Thus the metal-polymer complexes containing Co, Ni, Rh, Pd can be used as catalysts in hydroformylation, carbonylation or carboxylation reactions; complexes containing Fe, Co, Ni, Pd can be used as catalysts in oligomerisation reactions of mono- and diolefines; complexes containing Fe, Co, Pd, Pt can be used as catalysts in hydrogenation reactions of olefines, diolefines.

The efficiency of the new complexes of the present invention in a given reaction will depend on the selected metal and the experimental conditions.

The following examples illustrate the possibilities of the invention, but without having a restrictive character:

EXAMPLE 1

Preparation in Several Steps of a Polymeric Diphosphine.

To a suspension of $Ph_2PK_2$ dioxane (50 mM) in anhydrous ether (250 ml) a solution of recently redistilled epichlorhydrin 2.3 g (25 mM) in anhydrous ether was added dropwise, at 0° C and under argon. After decoloration of the reaction mixture, the latter was stirred for one hour at 25° C, then filtered to eliminate the potassium chloride formed. The filtrate was added to a suspension of a chloromethylated polystyrene with a chlorine content of 16% (5 g) in toluene (100 ml). After two hours of contact at 25° C, the mixture was heated for one hour at 50° C, then the reaction volume was reduced under vacuum to 50 ml. Methanol (200 ml) was then added to precipitate the polymer which was afterwards washed with methanol (5 × 20 ml), then with petroleum ether (5 × 20 ml). 6.8 g of a polymer containing 6.9% phosphorus and chloride traces was thus obtained. The maximum theoretical phosphorus content was 7.8%.

EXAMPLE 2

Preparation of a Polymeric Diphosphine without Isolation of the Intermediary Products.

A solution of 22.05 g (100 mM) of chlorodiphenylphosphine in dioxane (50 ml) was added dropwise under argon at 50° C to a suspension of potassium (0,2 at.g) in dry dioxane (200 ml). After complete addition of $Ph_2PCl$, the solution was stirred during one hour at 100° C and then cooled to about 10° C. A solution of epichlorhydrin (50 mM) in dioxane (25 ml) was then added dropwise and stirred during another hour at 25° C after complete addition. A solution of chloromethylated polystyrene at 5.5% (10 g) in dioxane (50 ml) was added and stirred during two hours at 25° C, then 1 hour at 50° C.

The reaction mixture was concentrated to 50 ml and treated with methanol (250 ml). The resulting precipitate was filtered, washed with methanol (5 × 20 ml) and then with petroleum ether (5 × 20 ml). 10.3 g polymer containing 1.95% phosphorus and traces of chlorine was thus obtained. The maximum theoretical phosphorus content was 2.7%.

EXAMPLES 3-5

These examples, using the same operating method was as in example 2, have shown that the presence of an excess amount of phosphorous reagent has only a small influence on the phosphorus content of the polymer.

| Example | $KPPh_2$ involved | Weight of polymer obtained (g) | Phosphorus content |
|---|---|---|---|
| 2 | 50 | 10.3 | 1.95 |
| 3 | 100 | 10 | 2.30 |
| 4 | 150 | 9.95 | 2.25 |
| 5 | 25 | 9.6 | 1.70 |

EXAMPLE 6

This example has shown that the substitution of Cl by I in the chloromethylated polystyrene reduces the contact time and slightly increases the final phosphorus content of the polymer.

A suspension of chloromethylated polystyrene at 5.5% (5 g) in dioxane (100 ml), previously contacted during 2 hours with potassium iodide (10 g), was added to an $KO(P_2)$ alcoholate solution prepared according to example 1. The reaction mixture was stirred during 2 hours at normal temperature, then treated as previously described and yielded 6.2 g polymer containing 2.35% phosphorus.

EXAMPLE 7

A suspension of Merrifield Fluka polymer, a polystyrene cross-linked with 2% of divinylbenzene and chloromethylated at 2.5% (5 g) in dioxane (50 ml) was added to an alcoholate solution prepared as in example 1. The mixture was stirred during 2 hours at 25° C, then 2 hours at 50° C. The reaction mixture, treated as previously described, yielded 5.2 g polymer containing 1.2% phosphorus. The maximum theoretical phosphorus content was 1.22%.

EXAMPLES 8-10

Cobalt-Containing Polymers (II)

A solution of dry cobalt chloride (xmM) in methanol (10 × ml) was added to a suspension of the polymeric phosphorus derived from the chloromethylated polystyrene containing 2% phosphorus (2.5 g) in methanol (50 ml).

The mixture was left during 1 hour at 50° C; the precipitate was then filtered and washed with methanol (5 × 10 ml). After drying, a pale blue product was obtained with a content varying according to the number of cobalt chloride equivalents involved.

| Example | x (mM) | Weight of product obtained (g) | Co (%) |
|---|---|---|---|
| 8 | 10 | 2.55 | 0.28 |
| 9 | 25 | 2.60 | 0.58 |
| 10 | 50 | 2.55 | 0.22 |

EXAMPLES 11-13

Nickel-Containing Polymers (II)

A solution of nickel chloride (xmM) dissolved in ethanol (10 × ml) was added to a suspension of the same polymeric phosphine (2.5 g) in ethanol (50 ml). The mixture was left during 1 hour at 50° C; the precipitate was then filtered and washed with ethanol (5 × 10 ml). After drying, a pale pink product was obtained, with a nickel content varying according to the number of nickel chloride equivalents involved.

| Example | x(mM) | Weight of product obtained (g) | Ni (%) |
|---|---|---|---|
| 11 | 10 | 2.50 | 0.38 |
| 12 | 25 | 2.55 | 0.53 |
| 13 | 50 | 2.60 | 0.42 |

EXAMPLE 14

Palladium-Containing Polymer (II)

A solution of bis(benzonitrile) palladium chloride (10 mM) in benzene (20 ml) was added to a suspension of the same polymeric phosphine (2.5 g) in benzene (50 ml). The reaction mixture was stirred during 48 hours at normal temperature, then concentrated under vacuum to one half, methanol (100 ml) was added, the resulting precipitate was filtered and washed with methanol (5 × 10 ml) and hexane (5 × 10 ml). After drying, a light brown polymer (2.7 g) was obtained with a palladium content of 8.75%.

EXAMPLE 15

Rhodium-Containing Polymer (I)

A solution of dichlorotetracarbonyl dirhodium (I) (2 mM) in benzene (20 Ml) was added under argon to a suspension of the same polymeric phosphine (2.5 g ) in benzene (50 ml). The reaction mixture was stirred during 72 hours at normal temperature, then concentrated under vacuum to one half, methanol was added (100 ml), the resulting precipitate was filtered and washed with methanol (5 × 10 ml) and hexane (5 × 10 ml). After drying, a brown-red polymer was obtained (2.45 g) with a rhodium content of 6.80%. It presented in IR CO bands at 2075 and 1985 cm-1 (the last band was very strong).

EXAMPLE 16

Co-Containing Polymer (O)

A solution of dicobalt octacarbonyl (10 mM) in benzene (20 ml) was added under argon to a suspension of the same polymeric phosphine (2.5 g) in benzene (50 ml). The reaction mixture was stirred during 4 hours at normal temperature, then during 2 hours at 60° C; it was then concentrated under vacuum and afterwards treated with hexane (100 ml). The resulting precipitate was filtered, washed with hexane (5 × 10 ml) and ether (5 × 10 ml). After drying, 2.8 g polymer was obtained with a cobalt content of 5.8%. It presented in IR CO bands at 2080, 2060, 1960$^{cm-1}$ (the last band was very strong).

EXAMPLE 17

Nickel-Containing Polymer (O)

A solution of nickel tetracarbonyl (10 mM) in benzene (20 ml) was added under argon to a suspension of polymeric phosphine containing 1.5% of phosphorus (2.5 g) in benzene (50 ml). The reaction mixture was stirred during 4 hours at normal temperature, then 2 hours at 40° C, concentrated under vacuum and treated with hexane (100 ml); the resulting precipitate was filtered, washed with hexane (5 × 10 ml) and ether (5 × 10 ml). After drying, a light grey polymer was obtained (2.55 g ) with a nickel content of 1.96%. It presented in IR CO bands at 2070, 1995 and 1940$^{cm-1}$.

It will be understood that the term "alkali alcoholate" occurring in the present specification relates to an alcoholates of an alkaline metal.

What is claimed is:

1. The method for preparing a polymeric diphosphine coordinate which comprises the step of contacting an alkali metal or alkaline earth metal alcoholate of diphosphine of the formula:

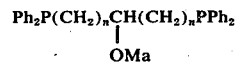

$$Ph_2P(CH_2)_nCH(CH_2)_nPPh_2$$
$$|$$
$$OMa$$

wherein Ma is an alkali metal or alkaline earth metal and $n$ is 1 to 4, dissolved in a solvent, with a halogenated polymer suspended in a liquid.

2. The method of claim 1 wherein $n$ is 1.

3. The method of claim 1 wherein said alcoholate and polymer are contacted for 2 to 24 hours at room temperature and then for 0.5 to 6 hours at an elevated temperature.

4. The method of claim 3 wherein said alcoholate and polymer are contacted for 4 to 8 hours at room temperature and 1–3 hours at elevated temperature.

5. The method of claim 1 wherein said halogenated polymer is a halogenated polyvinylic, polybutadienic or polystyrenic polymer and the halogen is chlorine, bromine or iodine.

6. The method of claim 1 wherein said halogenated polymer is a chlorinated or brominated polymer and said contacting takes place in the presence of a 10—100% stoichmetric excess of an alkali metal iodide.

7. The method of claim 1 wherein said solvent and said suspending liquid are non-protic and non-halogenated liquids.

8. The method of claim 1 wherein said alcoholate is prepared by contacting an alkali metal or alkaline earth metal diphenyl phosphine with epichlorohydrin, and wherein the resulting alcoholate is contacted with the halogenated polymer without isolation from the reaction mixture in which it is prepared.

9. The method of claim 1 further comprising the step of contacting the resulting coordinate with a transition metal salt or complex thereof in an inert solvent.

10. The method of claim 9 wherein the temperature is raised during the period of contact between the coordinate and the transition metal salt or complex thereof.

11. The method of claim 1 wherein said polymer is a polystyrenic polymer.

12. The method of claim 1 wherein said halogenated polymer is chloromethylated polystyrene.

* * * * *